United States Patent [19]

Volkrodt

[11] 4,127,786
[45] Nov. 28, 1978

[54] SYNCHRONOUS MACHINE WITH INNER ROTOR, EXCITED BY PERMANENT MAGNETS

[75] Inventor: Wolfgang Volkrodt, Bad Neustadt, Saale, Fed. Rep. of Germany

[73] Assignee: Siemens Aktiengesellschaft, Berlin and Munich, Fed. Rep. of Germany

[21] Appl. No.: 760,571

[22] Filed: Jan. 19, 1977

[30] Foreign Application Priority Data

Mar. 1, 1976 [DE] Fed. Rep. of Germany ....... 2608421

[51] Int. Cl.² ............................................ H02K 21/12
[52] U.S. Cl. .................................... 310/156; 310/262
[58] Field of Search ............... 310/156, 162, 261, 262, 310/217, 269

[56] References Cited

U.S. PATENT DOCUMENTS

| | | | |
|---|---|---|---|
| 2,939,025 | 5/1960 | Williford, Jr. | 310/156 X |
| 3,012,161 | 12/1961 | Puder | 310/156 |
| 3,014,142 | 12/1961 | Lee | 310/156 X |
| 3,445,700 | 5/1969 | Prange et al. | 310/156 |
| 3,492,520 | 1/1970 | Yates | 310/156 X |

Primary Examiner—Mark O. Budd
Attorney, Agent, or Firm—Kenyon & Kenyon, Reilly, Carr & Chapin

[57] ABSTRACT

A synchronous machine including a rotor having at least two lamination substacks, between which are arranged support disks of nonmagnetic material which are firmly mounted on the ferromagnetic rotor shaft. Each substack includes in the circumferential direction lamination stack parts whose number corresponds to the number of poles of the machine. Each substack further includes a ferrite magnet arranged between its lamination stack parts, and the ferromagnetic rotor shaft. The lamination stack parts and the support disks are held together in a frictionally connected and tight fitting manner by means of axial bolts.

3 Claims, 5 Drawing Figures

SYNCHRONOUS MACHINE WITH INNER ROTOR, EXCITED BY PERMANENT MAGNETS

BACKGROUND OF THE INVENTION

1. Field of the Invention

This invention relates to a synchronous machine and, in particular, to a synchronous machine having an inner rotor excited by permanent magnets.

2. Description of the Prior Art

Heretofore, in synchronous machines excited by permanent magnets, a large stray flux had to be tolerated in the magnetic circuit of the rotor because of the limited back magnetizability of the ferrites used for the permanent magnets. Due to the presence of such a large stray flux the degree of utilization of the machine was significantly reduced. Recently, with the discovery of ferrite magnets with high coercive force, it has become possible to realize a synchronous machine having reduced laminations as well as a low stray flux. However, while such a machine exhibits a higher torque per active machine volume, it also requires the use of an amagnetic shaft in the form of a double-T section. Such a shaft is relatively expensive to manufacture, so that the use of the machine becomes economically justifiable only at high speeds (up to 20,000 RPM) and, therefore, at large centrifugal forces.

It is a primary object of the present invention to provide a synchronous machine having a rotor which permits high machine utilization as well as the use of a conventional ferromagnetic shaft of simple design for rotor speeds which are not higher than 10,000 RPM.

SUMMARY OF THE INVENTION

In accordance with the principles of the present invention, the above and other objectives are realized in a synchronous machine including a rotor which comprises in the axial direction at least two lamination substacks, as well as support disks which rest against the former and are firmly mounted on the ferromagnetic shaft of the rotor. Each substack includes laminated stack parts whose number corresponds to the number of machine poles and each is provided with slots adapted to receive a starter cage. Additionally, each stack part further includes a ferrite magnet arranged between its slots and the ferromagnetic rotor shaft. The rotor is further provided with means in the form of axial bolts for connecting the laminated stack parts and support disks in a frictionally connected and close-fitting manner.

With the rotor constructed as above-described, the ferromagnetic rotor shaft can be of simple design and the ferrite magnets can surround the shaft like shells. Also, additional magnets can be inserted advantageously radially into the pole gaps. Finally, the support disks ensure perfect centering of the assembled rotor stack as well as the torque transmission of the shaft.

BRIEF DESCRIPTION OF THE DRAWINGS

The above and other aspects and features of the present invention will become more apparent upon reading the following detailed description in conjunction with the accompanying drawings, in which.

DETAILED DESCRIPTION

Figure 1:
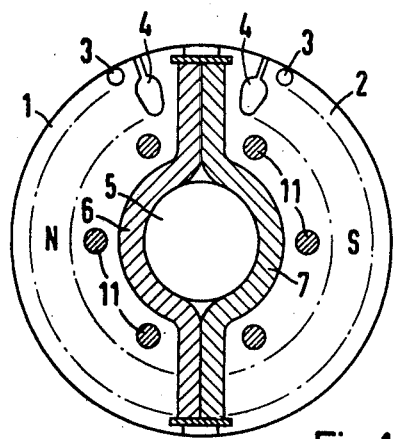
FIG. 1 shows in cross section a lamination substack of a rotor of a synchronous machine in accordance with the principles of the present invention.
Figure 2:
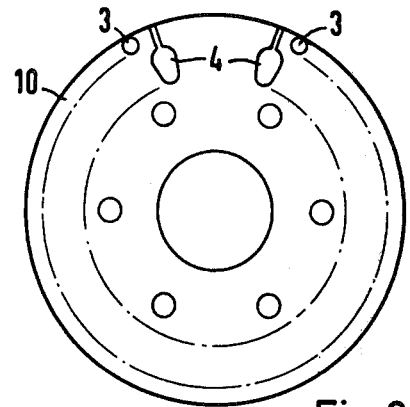
FIG. 2 shows a support disk of the lamination substack of FIG. 1.
Figure 4:
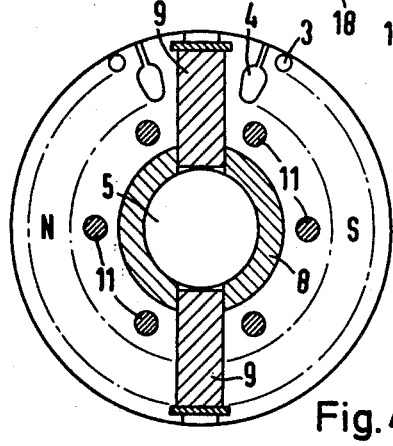
FIGS. 4 and 5 show in cross section lamination substacks of other embodiments of rotors of synchronous machines in accordance with the principles of the present invention.

FIG. 1 shows a lamination substack of a rotor of a synchronous machine in accordance with the principles of the present invention. The substack comprises two rotor stack parts 1 and 2 each comprised of electrical sheet laminations which are provided with slots 3 and 4 for receiving an alternating-bar starter cage. Between these stack parts and the rotor ferromagnetic shaft 5 are arranged two ferrite magnets 6 and 7, respectively. As shown, the latter magnets are designed as shell magnets with respect to the rotor shaft and outwardly as plane pole gap magnets. These magnets may be made of hard ferrite material or of plastic ferrite material. In the present embodiment of the invention, they are each in the form of an integral member or part, while in the embodiment of FIG. 4 each is in the form of separate members or parts, namely, shell magnets 8 and slab magnets 9.

Figure 3:
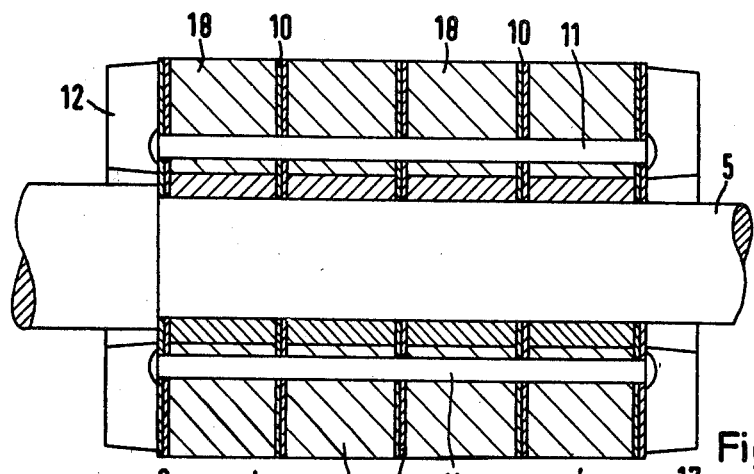
FIG. 3 illustrates a longitudinal cross section through a rotor constructed from a number of the substacks of FIG. 1.

As shown in FIG. 3, the entire rotor includes several axially arranged lamination substacks 18 of similar construction as the substack of FIG. 1. The rotor further includes support disks 10 disposed between the individual substacks as well as on the outer end faces of the first and last substacks. The support disks are comprised of an amagnetic material and have the same starter cage slots 3 and 4 as the substacks 18, but not the cutouts for the magnets. The disks, therefore, form rings closed in themselves, which are firmly mounted on the shaft 5. A frictional and close-fitting connection between the support disks 10 and the laminations of the stack parts of the substacks 18 is ensured by axial bolts 11 which extend through the disks and substacks and, in part, also by a die-cast cage 12.

Figure 5:
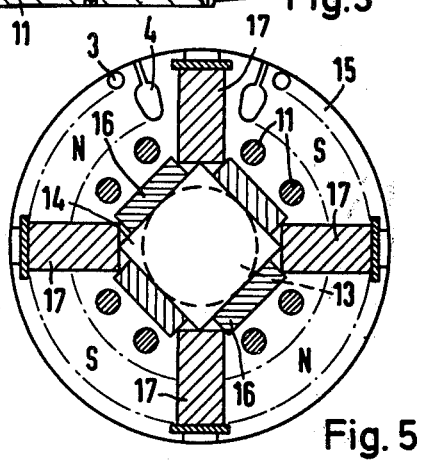

As can be appreciated, the embodiment of the rotor of the invention shown in FIGS. 1 to 4 relates to a rotor for a two-pole machine. A rotor in accordance with the invention for use with a four-pole machine is shown in FIG. 5. In this case, the shaft 13 of the rotor is turned by a square steel bar, the square cross section 14 having been retained in the area of the rotor substacks. Resting against the sides of the square bars are slab magnets 16 arranged between the shaft and the stack parts 15. Also included are magnet slabs 17 radially inserted at the pole gaps.

What is claimed is:

1. In a synchronous machine including magnets and a rotor, said rotor being excited by said magnets and having a ferromagnetic shaft which extends throughout the axial length of said rotor, the improvement comprising said rotor further including:
at least two lamination substacks arranged on said shaft in the axial direction of said rotor, each of said substacks including:
laminated stack parts whose number corresponds to the number of poles of said machine;
slots adapted to receive a starter cage;
and a ferrite magnet arranged between said laminated stack parts and said shaft;

amagnetic support disks which rest against said substacks and are firmly mounted on said ferromagnetic shaft;

and means for connecting said lamination stacks and support disks in a frictionally connected and close fitting manner, said connecting means comprising axial bolts.

2. In a machine in accordance with claim 1, the improvement further comprising:
said ferrite magnet of each of said substacks being a shell magnet of hard ferrite disposed around the ferromagnetic shaft.

3. In a machine in accordance with claim 1, the improvement further comprising:
said ferrite magnet of each of said substacks being a plastic ferrite magnet disposed around the ferromagnetic shaft.